United States Patent Office 3,153,031
Patented Oct. 13, 1964

3,153,031
QUATERNIZED DYESTUFFS
Marie-Josephe Jeanne Alicot née Calvo, Soisy-sous-Montmorency, and Robert Frédéric Michel Sureau, Enghienles-Bains, France, assignors to Compagnie Française des Matieres Colorantes, Paris, France, a French company
No Drawing. Filed Dec. 20, 1960, Ser. No. 77,037
Claims priority, application France, Dec. 22, 1959, 813,793
1 Claim. (Cl. 260—145)

The present invention relates to the new basic dyestuffs represented graphically by the following formulae:

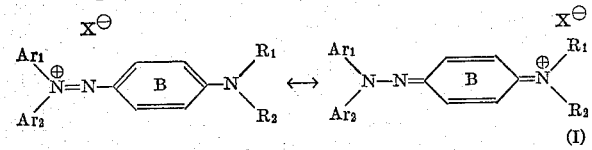

(I)

In these formulae, the symbol ↔ expresses a state of mesomerism between two extreme forms, pseudo-azo and quinoid; $Ar_1$ and $Ar_2$ represent two aryl nuclei or two arylene nuclei linked by a bridge linkage. $Ar_1$ and $Ar_2$ may be substituted by halogen atoms or by non-solubilising groups such as alkyl or alkoxy groups; $R_1$ and $R_2$ represent hydrogen atoms or alkyl, cyanoalkyl, chloroalkyl, hydroxyalkyl, alkoxyalkyl or other analogous radicals; in addition, one of the groups $R_1$ and $R_2$ may represent a phenyl group, the other then being a hydrogen atom or an alkyl group; X represents a monovalent anion or its equivalent; the benzene ring B may besides be substituted by a halogen atom or by alkyl, alkoxy or hydroxy groups or may also be joined to another benzene ring to form a naphthalene nucleus. The dyestuffs of the above formula may be prepared by reacting at temperatures varying between 0° C. and 60° C., for example, in acetone solution and in the presence of an organic acid, an approximately equimolecular mixture of an asymmetric diarylhydrazine of the general formula:

(II)

and an aromatic amine of the general formula:

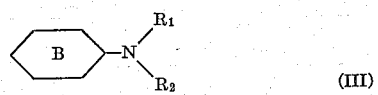

(III)

with an oxidising agent. In the general Formulae II and III $Ar_1$, $AR_2$, $R_1$, $R_2$ and the possible substituents of the nucleus B have the same significance as above.

The oxidising agents to be used may be, for example, hydrogen peroxide, sodium chlorite, chromates and dichromates, ferricyanides, per-salts such as persulphates, permanganates, or perborates, per-acids such as peracetic acid, organic peroxides such as that of methyl-ethyl-ketone, alkaline peroxides such as the dioxides of manganese and lead. The addition of the oxidising agent brings about more or less rapidly the appearance of an intense colouration. To isolate the dyestuff formed it is generally sufficient to dilute and to add sodium chloride or zinc chloride and so precipitate the dyestuff.

The reaction may be formulated as follows:

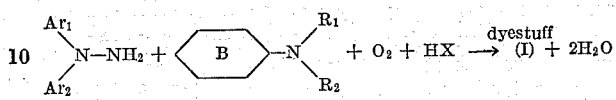

It is surprising in several respects. It is known in fact that certain heterocyclic hydrazones coupled with amines of the type (III) in the presence of oxidising agents; in any case, dyestuffs are then obtained of which one of the extreme forms is a true azo-compound. One may cite the following example:

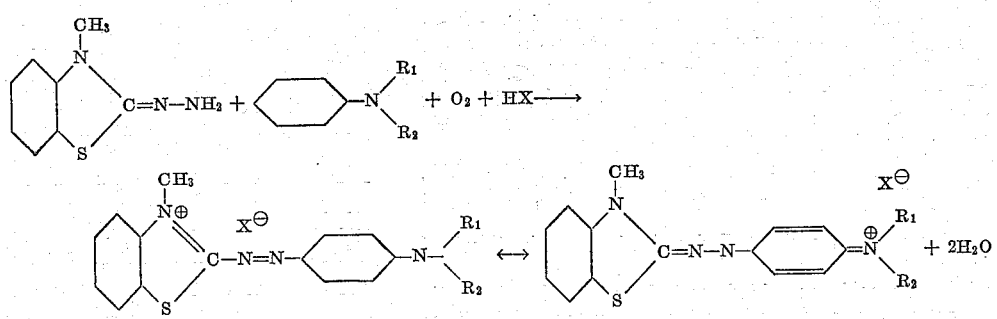

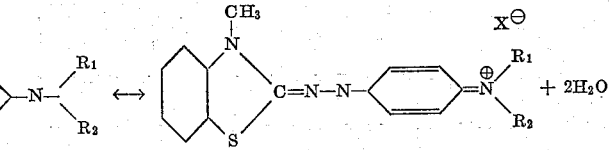

but it has never been pointed out that a hydrazine could be used in such a reaction in accordance with the process according to the invention.

On the other hand, this reaction was all the more problematical because a simple oxidation without coupling of the hydrazines of the Formula II could be possible, their sensitivity to oxidation being a well known property. It is established, in fact, that in the absence of a coupling compound, these hydrazines give by oxidising action products which are intensely coloured but which are devoid of tinctorial interest and very different from the dyestuffs of Formula I.

Finally, in the case where an acetone medium is used, the formation of hydrazone which stops the reaction could take place.

The nature of the dyestufls of Formula I has been established by analysis and by identification of the products of reduction. Stannous chloride causes scission and the amine $$\begin{array}{c} Ar_1 \\ \diagdown \\ NH \\ \diagup \\ Ar_2 \end{array}$$

and the diamine

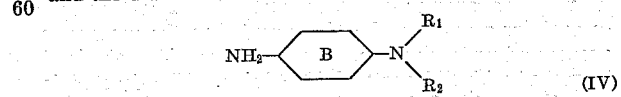

(IV)

have been identified.

The dyestuffs according to the invention are especially interesting for dyeing fibres based on polymers and copolymers of acrylontrile. The shades obtained are fullbodied and vary from red to blue and are endowed generally with excellent fastness and have good uniformity. Moreover, these dyestuffs leave animal fibres unaffected.

Dyeing is effected at the boil in an aqueous medium in the presence of a small quantity of a mineral acid or an organic acid such as formic, acetic, chloracetic, or trichloracetic acid. The amount of acid may be, for example, 40 ccs. of N acid solution per 100 grms. of fibres. In some cases it may be advantageous to add a small proportion of an oxidising agent to the dyebath.

In the following examples to which the invention is not limited, the parts are by weight unless the contrary is stated.

Example 1

18.4 parts of 1,1-diphenyl-hydrazine and 15 parts of N-diethylaniline are dissolved in 120 parts by volume of acetone. The solution is cooled to about 10° C. and 240 parts by volume of peracetic acid (prepared according to Organic Syntheses, VII, 395) are slowly introduced with agitation during a period of 1½ hours. The mixture is then agitated for 6 to 7 hours at room temperature, diluted with 1000 parts of water, filtered from slight impurities and the red dyestuff formed is precipitated by the addition of 20 to 30 parts by volume of a solution of zinc chloride prepared by dissolving 183 parts of this salt in 150 parts of water, then addition of 500 parts of saturated brine. The precipitated dyestuff is drained and dried under vacuum, 25 parts being thus obtained.

The dyestuff recrystallises in the course of time from absolute alcohol containing petroleum ether, and forms fine dark red needles. It melts at 170° C. on the Maquenne block or at about 200° C. by instantaneous projection. Its constitution corresponds approximately to the formula $C_{22}H_{24}N_3Cl$, $(Cl_2Zn)_{1/2}$.

Calculated, percent: C, 60.8; H, 5.54; N, 9.68; Cl, 16.37. Found, percent: C, 59.9, 60.1; H, 6.5, 6.2; N, 9.13, 9.21; Cl, 17.1, 17.3.

0.5 part of the dyestuff described above is dissolved in 2000 parts of water at 50–60° C., 2 parts by volume of formic acid are added, and 50 parts of polyacrylic fibres known commercially by the name "Orlon" or "Crylor" are introduced and the solution is brought slowly to the boil. It is maintained at the boil for 1½ hours and the bath is then exhausted. The fibre is dyed a bright and full-bodied bluish red which is very even and has excellent general fastness, especially to hard washing and to light.

For the dyeing of the acrylic fibre known as "Courtelle," the formic acid used in the preceding method of application is preferably replaced by one part by volume of trichloracetic acid in normal solution.

In the preceding preparation, for the same proportions of hydrazine, coupling compound and acetone, 20 parts by volume of acetic acid are added, then 40 parts of methylethylketone peroxide or 13 parts of sodium chlorite in concentrated solution are added in 1½ hours. On completing the operation as above an identical dyestuff is obtained.

Example 2

45.5 parts of N-aminocarbazole and 41 parts of N-diethylaniline are dissolved in 350 parts of acetone. The solution is heated to 60° C. and a solution of 125 parts of ammonium persulphate in 170 parts of water is introduced. A solution of 10 to 20 parts of sodium acetate in 40 to 60 parts of water is then added. The mixture is left for a quarter of an hour at 60° C., is then left to cool for a quarter of an hour and then the acetone is evaporated under vacuum. The gummy residue obtained is washed with 500 parts of 10% brine. The dyestuff is then dissolved in 3500 to 4000 parts of water. The solution is filtered in order to separate a little insoluble matter and is salted out in the cold with sodium chloride. The dyestuff precipitates in the solid state. It is drained and dried under vacuum. It melts around 145° C. on the Maquenne block.

0.5 part of this dyestuff is dissolved in 2000 parts of water at 65° C., and 4 parts by volume of formic acid and 0.5 part of ammonium persulphate (or one part by volume of a normal solution of sodium nitrite) are added. 50 parts of "Orlon" or "Crylor" fibres are introduced and the solution is brought to the boil in half an hour. The bath is exhausted at the end of 20 minutes' boiling. It is allowed to boil for a further 10 minutes and the skein, which is dyed an intense royal blue having excellent general fastness, is rinsed.

Example 3

27 parts of $N_1$-phenyl-$N_1$($\alpha$-naphthyl)-hydrazine hydrochloride are dissolved in 150 parts by volume of acetone. 15 parts of N-diethylaniline and 60 parts by volume of acetic acid diluted with 30 parts of water are added. This mixture is agitated at ordinary temperature. About 20 parts of manganese dioxide are introduced in 1½ hours, and the mixture is agitated for 3 to 4 hours. The red dyestuff formed is then taken up in 1000 parts of hot water. The solution is filtered in order to separate any insoluble impurities. The dyestuff is precipitated in the cooled filtrate by addition of 30 parts by volume of a solution of zinc chloride (183 parts of zinc chloride dissolved in 150 parts of water) and 500 parts of 20% brine.

About 28 parts of dyestuff are obtained, which dyes fibres based on polymers or co-polymers of acrylonitrile a bright red shade which is remarkably fast to light.

The following table lists a certain number of examples analogous to those above; the shades indicated are the shades on fibres based on polymers or co-polymers of acrylonitrile.

| Ex. | Hydrazine | Coupling Compound | Shade |
|---|---|---|---|
| 4 | 1,1-diphenylhydrazine | N-dimethylaniline | Red. |
| 5 | ----do---- | N-ethyl-N-hydroxyethyl aniline. | Bluish-red. |
| 6 | ----do---- | N-di-(hydroxyethyl)-m-toluidine. | Red-currant. |
| 7 | ----do---- | N-ethyl-N-benzyl-aniline. | Do. |
| 8 | ----do---- | N-diethyl-m-toluidine. | Bluish-red. |
| 9 | ----do---- | 2-methoxy-5-methyl-aniline. | Brick-red. |
| 10 | ----do---- | N-dimethyl-m-toluidine. | Bluish-red. |
| 11 | ----do---- | N-ethyl-2′,3′-dihydroxypropyl-m-toluidine. | Red. |
| 12 | ----do---- | N-ethyl-N-chlorethyl aniline. | Ruby. |
| 13 | ----do---- | N-hydroxyethyl-N-cyanethyl-m-toluidine. | Do. |
| 14 | ----do---- | N-dihydroxyethyl-2-methoxy-5-methylaniline. | Bluish-red. |
| 15 | ----do---- | 3-N-ethylamino-4-methylphenol. | Brown-yellow. |
| 16 | ----do---- | N-diethylamino-phenol. | Orange-brown. |
| 17 | ----do---- | N-dimethyl-$\alpha$-naphthylamine. | Violet. |
| 18 | ----do---- | N-phenyl-$\alpha$-naphthyl-amine. | Do. |
| 19 | ----do---- | N-ethyl-$\alpha$-naphthyl-amine. | Red-violet. |
| 20 | ----do---- | N-ethyl-m-toluidine. | Brick-red. |
| 21 | ----do---- | N-ethyl-o-toluidine. | Do. |
| 22 | ----do---- | Diphenylamine. | Red-violet. |
| 23 | ----do---- | 5-methyl-2-methoxy-N-dimethylaniline. | Bluish-red. |
| 24 | ----do---- | 3-methoxy-N-dimethylaniline. | Brown-orange. |
| 25 | ----do---- | 2,5-dimethoxy-N-dimethylaniline. | Do. |
| 26 | 1-phenyl-1-(4′-methoxyphenyl)-hydrazine. | N-diethylaniline. | Violet. |
| 27 | 1-phenyl-1-(3′-methoxyphenyl)-hydrazine. | ----do---- | Bordeaux. |
| 28 | ----do---- | N-ethyl-$\alpha$-naphthyl-amine. | Red-violet. |
| 29 | 1-phenyl-1-(4′chlorophenyl)-hydrazine. | Diethylaniline. | Red. |
| 30 | 1-phenyl-1-$\alpha$-naphthylhydrazine. | N-dimethylaniline. | Do. |
| 31 | ----do---- | N-ethyl-N-hydroxyethylaniline. | Bluish-red. |
| 32 | ----do---- | N-diethyl-m-toluidine. | Red. |
| 33 | ----do---- | N-dimethyl-m-toluidine. | Bluish-red. |
| 34 | ----do---- | N-dimethyl-m-anisidine. | Brown-orange. |
| 35 | ----do---- | 5-methyl-2-methoxy-N-dimethylaniline. | Red. |

| Ex. | Hydrazine | Coupling Compound | Shade |
|---|---|---|---|
| 36 | 1-phenyl-1-α-naphthylhydrazine. | N-monoethyl-o-toluidine. | Scarlet. |
| 37 | ----do---- | N-monoethyl-m-toluidine. | Do. |
| 38 | ----do---- | 5-methyl-2-methoxy-aniline. | Do. |
| 39 | ----do---- | N-ethyl-α-naphthylamine. | Ruby. |
| 40 | ----do---- | N-ethyl-N-cyanethyl-m-toluidine. | Bluish-red. |
| 41 | ----do---- | N-ethyl-N-chloroethylaniline. | Rose. |
| 42 | ----do---- | N-dihydroxyethyl-m-toluidine. | Bluish-red. |
| 43 | ----do---- | 5-methyl-2-methoxy-N-dihydroxyethylaniline. | Red. |
| 44 | ----do---- | 2,5-dimethoxy-N-dimethylaniline. | Orange. |

We claim:
Dyestuffs of the formula:

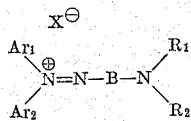

in which $R_1$ represents a member selected from the group consisting of the hydrogen atom, the alkyl and hydroxyalkyl groups having up to 3 carbon atoms, the chloroethyl and cyanoethyl groups, $R_2$ represents a member selected from the group consisting of the hydrogen atom, the alkyl and hydroxyalkyl groups having up to 3 carbon atoms, the phenyl and benzyl groups, B represents a member selected form the group consisting of the p.phenylene group, the chloro-substituted p.phenylene group, the methyl substituted p.phenylene group, the methoxy substituted p.phenylene group and the p.naphthylene group, $Ar_1$ represents a member selected from the group consisting of the phenyl and α-naphthyl groups, $Ar_2$ represents a member selected from the group consisting of the phenyl, 4-methoxyphenyl, 3-methoxyphenyl, 4-chlorophenyl groups and X represents a monovalent anion.

References Cited in the file of this patent
UNITED STATES PATENTS
2,832,764    Huenig et al. _____ Apr. 29, 1958